Figure 1:
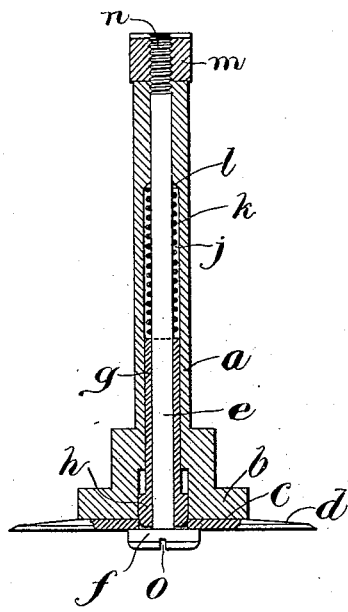

No. 870,220. PATENTED NOV. 5, 1907.
J. BROOKS.
DISK KNIFE HOLDER.
APPLICATION FILED APR. 15, 1907.

Witnesses:
A. C. Ratigan
B. W. Glover

Inventor:
John Brooks
by Wright Brown Quinby May
Attorneys.

UNITED STATES PATENT OFFICE.

JOHN BROOKS, OF BROCKTON, MASSACHUSETTS.

DISK-KNIFE HOLDER.

No. 870,220.  Specification of Letters Patent.  Patented Nov. 5, 1907.

Application filed April 15, 1907. Serial No. 368,409.

*To all whom it may concern:*

Be it known that I, JOHN BROOKS, of Brockton, in the county of Plymouth and State of Massachusetts, have invented certain new and useful Improvements in Disk-Knife Holders, of which the following is a specification.

This invention relates especially to skiving machines, and consists of a holder by which the disk knife of such a machine may be secured and accurately centered so that it will not work loose and give way while in use.

The circular disk knives which are used for skiving frequently become somewhat distorted during the hardening and tempering so that the holes or eyes by which they are centered on the holding spindle lose their true circular shape and become distorted. Thus after hardening they will not fit an arbor upon which they may have accurately fitted before this operation. Consequently it has usually been the practice hitherto to make the eyes of such knives sufficiently large before hardening so that after they have been hardened the eyes will still be large enough to fit over the bushings or arbors made for them. As a result of course there was always a certain amount of looseness which interfered with the proper grinding of the cutters and allowed them to slip and fail to work properly.

It is my present object to provide a rotary holder which will automatically center the disk, whatever may be the size and shape of the distorted central hole, so that there will be no opportunity for it to slip and vibrate laterally. Accordingly I provide the holder constructed as hereinafter described and claimed and substantially as shown in the drawings.

Figure 3:
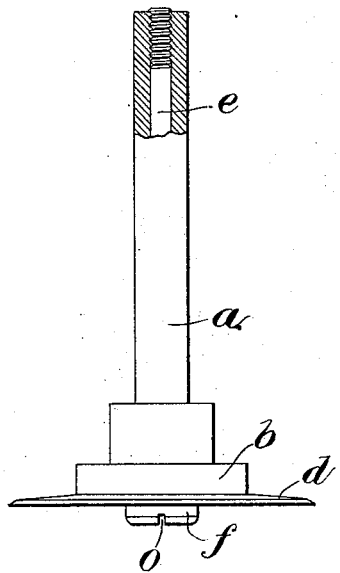
Figure 2:
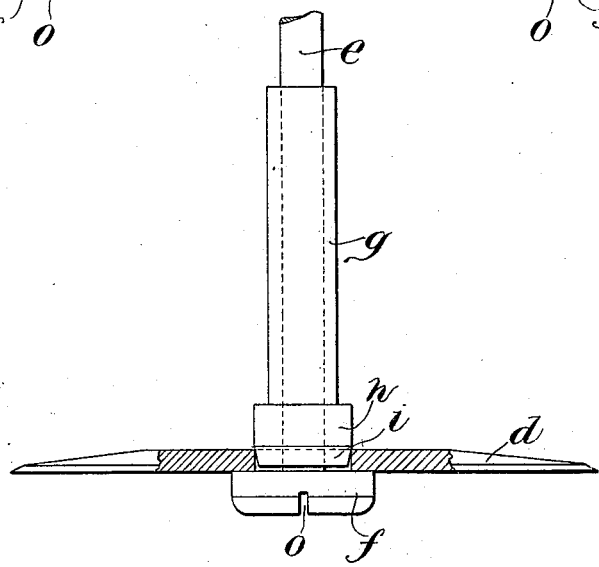

Of the accompanying drawings,—Figure 1 represents a sectional view of a cutter holder and cutter applied thereto. Fig. 2 represents a sectional elevation on an enlarged scale, of the centering device of the holder and the manner in which it operates. Fig. 3 represents a sectional elevation showing a modification.

The same reference characters indicate the same parts in all the figures.

Referring to the drawings, the main portion of the holder consists of a spindle $a$ which is adapted to be driven rotarily in bearings in the machine, and has a head or flange $b$ provided on its outer end with a flat bearing surface $c$ perpendicular to the axis of the spindle. The upper side of the disk knife $d$ is adapted to have a bearing against the face $c$ near the periphery thereof.

The spindle is tubular, having a central bore through which passes the shank $e$ of a retainer for the cutter which has on its outer end a head $f$ adapted to bear upon the under side of the disk knife and hold the latter against the face $c$. As appears in Figs. 1 and 2, the upper or inner face of the head $f$ is flat and extends in a single plane from the shank to the periphery of the head, being therefore parallel with the face $c$.

A portion of the bore of the spindle is enlarged to a greater diameter than that of the shank $e$, and in this enlarged portion is located a sleeve $g$ which surrounds the retainer shank and occupies the space between the latter and the sides of the spindle. This sleeve has on its outer end a head $h$ which is beveled so that its tip has the shape of a cone frustum represented at $i$ in Fig. 2. The greatest diameter of the head $h$ is greater than that of the eye of any cutter for which it is adapted, while the diameter at the outer end is less than the eye of any such cutter. The length of the conical portion also is at most no greater than the thickness of the disk knife, so that when it enters the eye of a cutter, it will engage the edges of the same before its end emerges from the under side of the eye.

Within the cavity or chamber $j$ of the spindle back of the centering sleeve $g$ is a spring $k$ which surrounds the retainer shank and bears at one end against the sleeve while its other end is arrested by the shoulder $l$. This spring forces the sleeve outward toward the retainer head $f$ and serves to hold the cone frustum $i$ in firm engagement with the edges of the cutter eye. The sleeve and spring are retained in the chamber and the cutter held against the surface of the spindle head $b$ by a nut $m$ which engages the threaded end $n$ of the retainer shank and draws the head thereof against the cutter, clamping the latter against the spindle. In Fig. 3 the separate nut $m$ is omitted and the retainer is held in place by the engagement of its threaded end with internal threads formed in the end of the spindle. The retainer is fastened in place by being turned by a screw-driver which can be inserted in a slot $o$ in the head $f$.

It will be seen that the centering sleeve is always held in engagement with the central hole of the cutter with which it makes contact at three or more points so that the cutter cannot possibly move sidewise after once being clamped in place. As the conical portion of the sleeve is of less length than the thickness of the cutter and does not protrude through the eye of the cutter, there is no necessity of forming an annular recess or groove to receive the same in the head of the retainer around the shank thereof; consequently the clamping surface of this retainer head may be made plane, as hereinbefore described and given a bearing on the entire area of the cutter which it overlaps.

I claim:—

1. An attachment for skiving machines, comprising in combination, a long tubular spindle adapted to be contained in a bearing in the head of a skiving machine, a laterally-extending wide flange on the end of said spindle having a plane surface at right angles to the spindle axis, a thin wide disk knife bearing against the plane surface of said flange near the periphery of the latter, a centering sleeve within the bore of the spindle having a greater diameter than the eye of the knife and formed with a conical zone on its outer end of a height not greater than the thickness of the knife and tapering to a less diameter than the eye thereof, yielding means tending to force the conical end of said sleeve out of the spindle and into the eye of the knife, and a retainer having a shank passing through the spindle and secured at the remote end thereof, and a head pressing the knife against the bearing surface of the flange, whereby the knife is held firmly with its circular edge in a plane perpendicular to its axis of rotation.

2. A disk-knife holder for skiving machines, comprising a tubular spindle having a bearing surface at one end, a retainer provided with a head adapted to hold a disk-knife against said bearing surface and a shank passing through the bore of the spindle, a centering sleeve within the bore of the spindle having an external bearing on the inner surface of the spindle so as to be held centrally therein, and formed with a tapered end, and yielding means pressing said tapered end toward the head of the retainer and into the eye of the disk to center the same, said sleeve having a diameter as great as that of the eye at a less distance from its end than the thickness of the disk.

3. A rotary cutter holder, comprising a tubular spindle having a flange at one end with an outer plane abutting surface for the cutter, a retainer having a shank adapted to be held within the bore of the spindle and having a head with a surface extending in one plane from the shank to the periphery thereof, opposed to the abutting surface of the spindle flange for clamping a cutter against the latter, and a centering sleeve contained within the bore of the spindle surrounding the retainer shank and yieldingly impelled outward toward the head of the retainer, said centering sleeve being tapered at its outer end and of such diameter as to contact with the rim of the eye of the cutter before being projected entirely through the same.

4. A rotary cutter holder, comprising a tubular spindle adapted to be held rotatably in bearings, having at one end a transverse abutting surface for the cutter and a central cavity of greater diameter than the bore of the spindle, an integral shoulder between said bore and cavity, a retainer having a shank adapted to be passed through said bore and a head for clamping the cutter against the abutting surface of the spindle, a centering sleeve having a tapered end for entering the eye of the cutter, located within said recess, and a spring also located in said recess and pressing against said shoulder and sleeve for projecting the tapered end of the latter into the eye of the cutter.

In testimony whereof I have affixed my signature, in presence of two witnesses.

JOHN BROOKS.

Witnesses:
A. C. RATIGAN,
ARTHUR H. BROWN.